United States Patent
Wieres

[19]

[11] Patent Number: 6,049,980
[45] Date of Patent: *Apr. 18, 2000

[54] APPARATUS AND METHOD FOR PRODUCING A HONEYCOMB BODY

[75] Inventor: Ludwig Wieres, Overath, Germany

[73] Assignee: Emitec Gesellschaft fuer Emissionstechnologie mbH, Lohmar, Germany

[*] Notice: This patent issued on a continued prosecution application filed under 37 CFR 1.53(d), and is subject to the twenty year patent term provisions of 35 U.S.C. 154(a)(2).

[21] Appl. No.: 09/020,871

[22] Filed: Feb. 9, 1998

Related U.S. Application Data

[63] Continuation of application No. PCT/EP96/02629, Jun. 18, 1996.

[51] Int. Cl.[7] .......................... B21D 53/00; B21D 11/14
[52] U.S. Cl. ............................................... 29/890; 72/371
[58] Field of Search ............................... 29/890; 72/398, 72/401, 394, 403, 371; 228/173.6, 181

[56] References Cited

U.S. PATENT DOCUMENTS

| | | | |
|---|---|---|---|
| 1,880,454 | 10/1932 | Klocke | 72/401 |
| 2,416,989 | 3/1947 | Gauthier | 72/371 X |
| 3,220,239 | 11/1965 | Olsen et al. | 72/394 |
| 3,899,913 | 8/1975 | Schlosser et al. | 72/401 X |
| 4,677,839 | 7/1987 | Retallick | 72/394 X |
| 5,755,029 | 5/1998 | Learned | 29/426.1 |

*Primary Examiner*—Joseph M. Gorski
*Attorney, Agent, or Firm*—Herbert L. Lerner; Laurence A. Greenberg; Werner H. Stemer

[57] ABSTRACT

The apparatus produces a honeycomb body, in particular a catalytic carrier body, from at least one stack of structured metal sheets which define a plurality of passages through which a fluid flows in the honeycomb body. The apparatus has a forked holding device which engages each stack, and former segments. The former segments are closeable to constitute a former. Each former segment has a respective surface portion. When the segments are closed, the surface portions jointly define the external shape of the honeycomb body to be produced. At least two of the former segments are displaceable such that at least a part of each surface portion, bearing against the stack, describes a path of movement towards free ends of the stack. The path of movement corresponds to the external shape of the honeycomb body.

4 Claims, 2 Drawing Sheets

APPARATUS AND METHOD FOR PRODUCING A HONEYCOMB BODY

CROSS-REFERENCE TO RELATED APPLICATIONS

This is a continuation of copending international application PCT/EP96/02629, filed Jun. 18, 1996, which designated the United States.

BACKGROUND OF THE INVENTION

FIELD OF THE INVENTION

The present invention pertains to an apparatus and a method of producing a honeycomb body, in particular a catalyst carrier body for catalytic converters, from at least one stack of a plurality of at least partially structured metal sheets.

Catalytic converters are used to reduce the amount of pollutants in exhaust gases, in particular in motor vehicle exhaust gases. The carrier bodies in such catalytic converters may be metallic honeycomb bodies. Such honeycomb bodies are formed of a stack comprising a plurality of at least partially structured metal sheets. U.S. Pat. No. 4,923,109 discloses a honeycomb body with a stack twisted in opposite directions about itself and about a central region.

Furthermore, U.S. Pat. No. 5,135,794 (int'l publication WO 90/03220) discloses a metallic catalytic converter carrier body which is constructed from at least partially structured metal sheets. That catalytic converter carrier body includes at least three stacks of metal sheets, wherein at least three of the stacks are folded about a respective associated bend line in the central region of the honeycomb body and are twisted in the folded condition region with the bend lines.

Apparatuses are known for the production of such honeycomb bodies. Generally, these apparatuses comprise a forked winding device which engages each stack and rotates about an axis, and former segments which close to constitute a former. The internal contour of the closed former corresponds to the external contour of the honeycomb body after winding. In order to ensure winding of the stack or stacks about itself or themselves and about a central region, the former segments are moved towards the stack in such a way that, during the rotary movement of the forked twisting device, the stack or stacks bear against the edge of the former segments and that edge forms a support means. Towards the end of the production procedure the former is completely closed and thus imparts to the honeycomb body its final form.

The prior art apparatuses have two segments which are movable towards and away from each other along a straight line.

During the closing procedure there is the risk that at least one former segment may move in opposite relationship to the direction of movement of the portion of the stack, which is still to be twisted. If the former segment moves against the stack portion, that can result in undesired deformation of the stack or stacks. Such deformation can have the result that individual metal sheets of the stack are partially buckled. The deformation of the metal sheets influences the structure of the honeycomb body. On the one hand the strength of the honeycomb body suffers from such deformation phenomena and on the other hand there is a local variation in the passage cross-sections. Such variations in the passage cross-section give rise to irregular distribution of the exhaust gas profile through the honeycomb body, which may affect the catalytic efficacy of the honeycomb body.

Conventional honeycomb bodies are predominantly circular in cross sectional. The production of other cross-sections requires different production methods. Such a production method is known for example from U.S. Pat. No. 4,519,120. That production method provides that a honeycomb body is first wound and then deformed with certain tools.

SUMMARY OF THE INVENTION

It is accordingly an object of the invention to provide an apparatus and a method of producing honeycomb bodies, which overcomes the above-mentioned disadvantages of the prior art devices and methods of this general type and which safely prevents deformation of stacks or individual metal sheets during the production process. It is a further object of the invention to allow the production of honeycomb bodies with noncircular cross-section.

With the foregoing and other objects in view there is provided, in accordance with the invention, an apparatus for producing a honeycomb body (e.g. a catalyst carrier body of a catalytic converter) from at least one stack of a plurality of structured metal sheets defining therebetween passages through which a fluid can flow, the apparatus comprising:

a forked holding device engaging at least one stack of metal sheets;

a plurality of former segments displaceably disposed so as to be closeable to define a former, each of the former segments having a respective surface portion which, upon closing the former segments to the former, together define an external shape of a honeycomb body to be produced from the at least one stack;

at least two of the former segments being displaceable along a given path wherein at least one part of each the surface portion, while bearing against the at least one stack, describes a path towards a respective free end of the at least one stack corresponding to the external shape of the honeycomb body to be produced.

In accordance with an added feature of the invention, the at least two former segments are displaceable in the same direction.

In other words, the invention is essentially distinguished by the at least two former segments which can be so displaced that at least a part of each surface portion, bearing against the stack, describes a path of movement in the direction of the respective free end of the stack which corresponds to the external shape of the honeycomb to be produced. By virtue of the fact that at least a part of each surface portion describes a path of movement, corresponding to the external shape, in the direction of the respective free end of the stack, the respective portion of the stack which is in contact with the part of the surface portion of the former segment is deformed in such a way that at the end of the operation of forming the stacks the desired external shape of the honeycomb body to be produced is obtained. The fact that the direction of the path of movement is towards the respective free end of the stack avoids deformation of the individual sheet metal layers or stacks. This is in contrast to the prior art method, as the former segments bend the portions of the stack into the final shape. Depending on the desired external shape of the honeycomb body to be produced, it is possible to select any suitable number of former segments which provide for twisting or winding of the stacks or individual sheet metal layers. In a preferred embodiment, the apparatus has two former segments which are displaceable in the same direction. It will be appreciated that the part of the surface portion of the former segment may be of different lengths, during the sequence of movements. That depends on the one hand on the sequence of movements of the former segment and on the other hand on the external shape of the honeycomb body to be produced.

In accordance with an additional feature of the invention, the at least two former segments are positioned opposite one another, preferably as a pair, in their respective starting positions. While not absolutely necessary, the former segments may be displaced in mutual synchronicity. It is sufficient, however, for the speed of the individual movements of the former segments to be so different that the former segments do not hit against each other during production of the honeycomb body.

In accordance with again an added feature of the invention, the plurality of former segments includes at least one radially movable former segment defining a closing segment for closing the former. In other words, the former is configured with at least one radially inwardly and radially outwardly movable former segment which forms a closing segment. The former is closed with that closing segment in the final condition, in order to impart its final, definitive shape to the honeycomb body.

With the above and other objects in view there is also provided a method of producing a honeycomb body with a plurality of passages through which a fluid can flow from a plurality of structured metal sheets, which comprises:

layering a plurality of structured metal sheets into at least one stack;

introducing the at least one stack into an open former and holding the stack in a central region of the former with a holding device; and displacing at least two former segments of the former out of their starting positions until at least a part of each former surface thereof comes to bear against the at least one stack;

moving the at least two former segments along a path of movement corresponding to an external shape of a honeycomb body to be produced until a predetermined degree of winding is attained; and subsequently closing the former.

In accordance with a concomitant feature of the invention, the layering step comprises layering a plurality of stacks from a plurality of structured metal sheets, and the method further comprises folding each of the plurality of stacks about a respective bending line.

In other words, a stack is first layered from a plurality of at least partially structured metal sheets. The stack is introduced into an open former and held therein by a holding device in a central region of the former. The ends of the stack extend from the central region radially outwardly. At least two former segments are each displaced out of their starting positions so that at least a part of each curved surface portion comes to bear against the stack. Thereafter the former segments are moved along a path of movement which corresponds to the external shape of the honeycomb body to be produced. At least one part of each surface portion is thereby always in contact with the stack. The former is closed after a predetermined degree of winding of the stacks is achieved.

The honeycomb body may also be produced from a plurality of stacks (each with a plurality of at least partially structured metal sheets). Each stack is folded along a bend line. The process is substantially the same as with the a single stack, namely the stacks are introduced into the open former and held therein by a holding device. At least two former segments are each moved out of their starting positions and their curved surfaces, or a part thereof, follow a path corresponding to the external shape of the honeycomb while they bear against the respective stack. Finally, the former is closed after a predetermined degree of wrapping or winding of the stacks has been achieved.

The apparatus and the method of the invention afford the possibility of producing honeycomb bodies which are of a cross-section that differs from a circular cross-section. It is thus possible for example to produce an oval honeycomb body or a honeycomb body of race-track form, without any need for deformation of the stacks or metal sheets. The described apparatus and method result in a honeycomb body with an even and regular structure.

Other features which are considered as characteristic for the invention are set forth in the appended claims.

Although the invention is illustrated and described herein as embodied in an apparatus and a method for producing a honeycomb body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
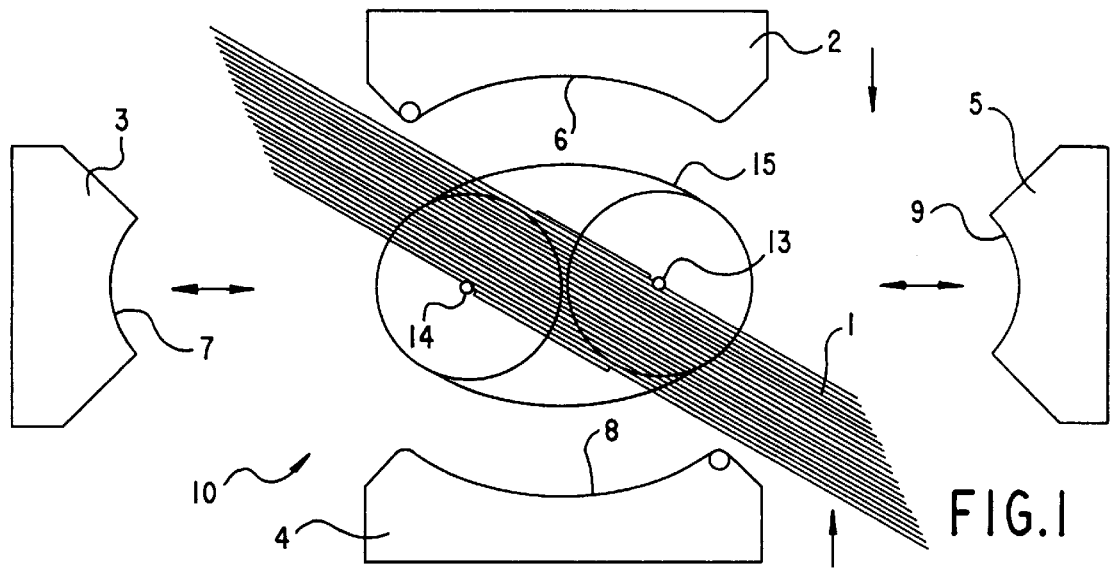
FIG. 1 is a diagrammatic plan view of an apparatus for producing a honeycomb body, with the former in the open position.

Referring now to the figures of the drawing in detail and first, particularly, to FIG. 1 thereof, there is seen an apparatus with a forked holding device which holds the stack 1 tightly in the central region of the former. The stack 1 is a stack of metal sheets which are structured with form deviations from the flat shape, such as with corrugations and the like. The structuring may be on some of the sheets and it may be only partial (e.g. a sheet may be partly flat and partly corrugated). The stack 1 is twisted around bars 13, 14 of the holding device. The former has four former segments 2, 3, 4 and 5. Together in the closed position, they form a former 10. Each former segment 2 to 5 has a curved surface portion 6, 7, 8 and 9. When the segments are joined to the former 10, the curved surface portions together define an external shape 15 of the honeycomb body to be produced.

The former segments 3 and 5 are displaceable radially inward and radially outward, as indicated by the horizontal double arrows.

Figure 2:
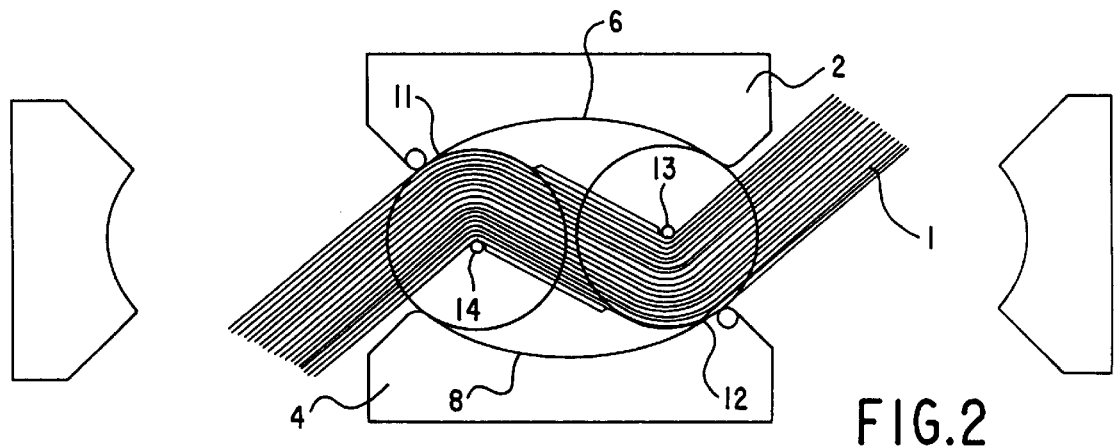
FIGS. 2–4 are similar views illustrating different positions of movable former segments.

In FIG. 2 the former segments 2 and 4 have been brought to bear against the stack 1. The part 11 of the surface portion 6 of the former segment 2 and the part 12 of the surface portion 8 of the former segment 4 bear against the stack 1. The portion of the stack which projects out of the former from the bars 14 and 13 respectively is bent over in a manner corresponding to the curvature of the parts 11 and 12 respectively.

Figure 3:
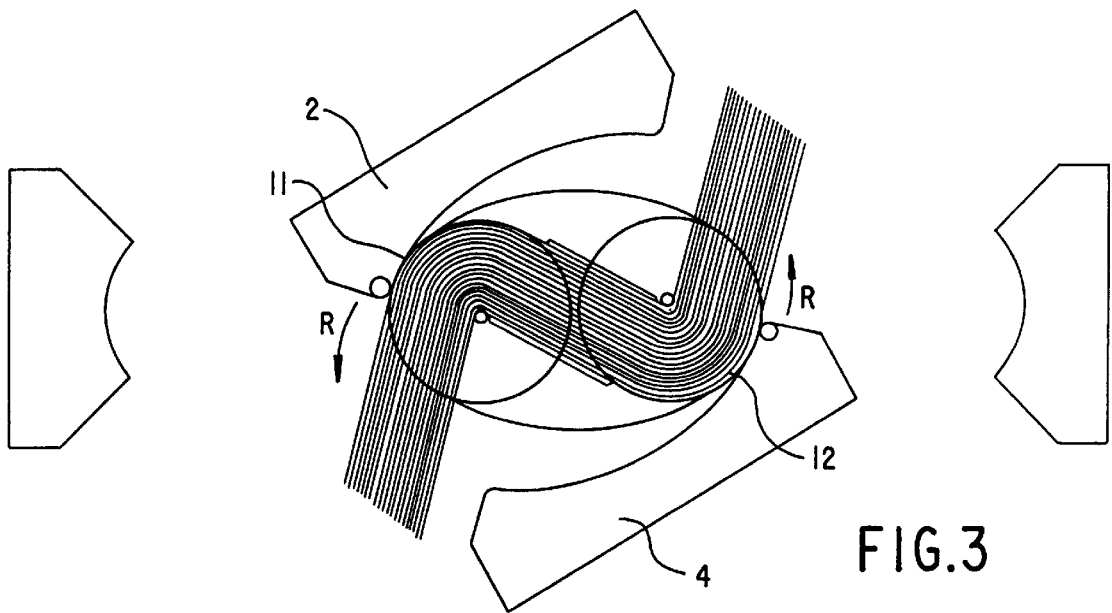
Figure 4:
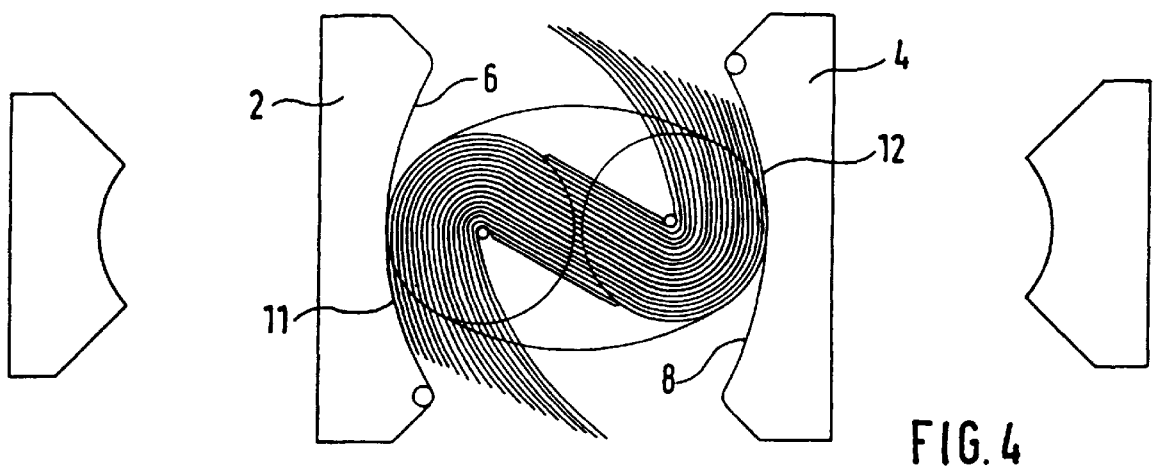

FIG. 3 shows the position of the former segments 2 and 4 which they assume after they have been rotated about 30°. A further portion of the stack was deformed during the rotation in the direction indicated by the arrow R. In that respect, the rotary movement of the former segments 2 and 4 took place in such a way that the parts 11 and 12 respectively of the former segments 2 and 4 always bore against the stack. By virtue of a further rotary movement of the former segments 2 and 4 they take up a position as is shown in FIG. 4. In that respect the former segments 2 and 4 have been turned through 90° relative to their original position. As can be seen in particular from FIG. 4 the part 11 and 12 respectively of each of the surface portions 6 and 8 respectively is substantially greater than as shown in FIGS. 2 and 3. The stack is put into its final shape by virtue of further displacement of the former segments 3 and 4. In the illustrated embodiment a rotary movement of the segments 2 and 4 through 180° is sufficient because the honeycomb body is mirror-image symmetric in its structure. The movement of the two former segments 2 and 4 was effected synchronously.

Figure 5:
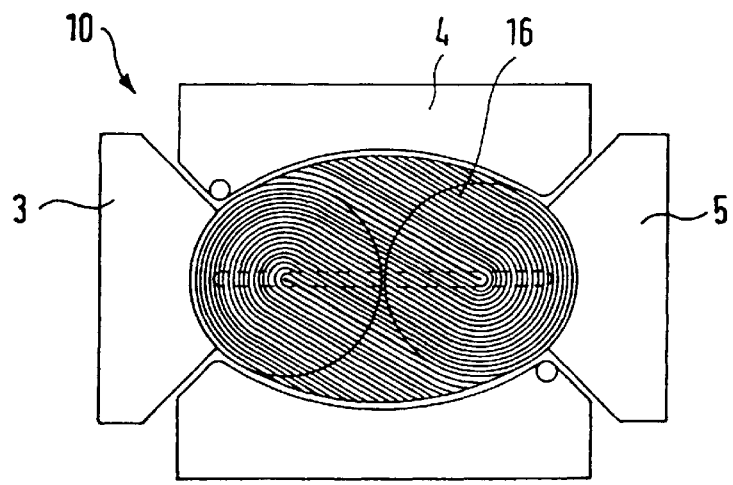
FIG. 5 is a plan view with the former partly closed.
Figure 6:
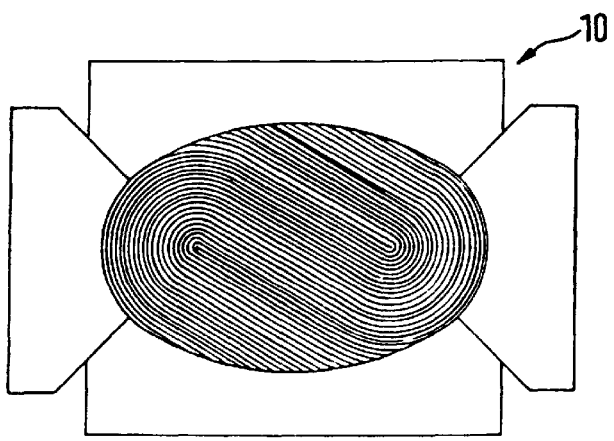
FIG. 6 is a similar view with the former in the closed position.

After the former segments 2 and 4 have reached their position shown in FIG. 5, the two former segments 3 and 5 are moved radially inwardly to the honeycomb body 16. The former 10 is still not definitively closed, as can be seen from FIG. 5. The former 10 is closed, as is illustrated in FIG. 6, by the individual former segments 2 to 4 being further moved towards the honeycomb body.

I claim:

1. A method of producing a honeycomb body having a plurality of passages through which a fluid can flow, comprising the steps of:
    providing an apparatus having:
        (i) a first former segment and a second former segment each having an inner surface;
        (ii) a third former segment and a fourth former segment each having an inner surface; and
        (iii) a holding device centrally disposed with respect to the former segments, wherein the inner surface of the first former segment faces the inner surface of the second former segment, the inner surface of the third former segment faces the inner surface of the fourth former segment, and the former segments are movable towards the holding device from a first position to a second position at which the inner surfaces of the former segments in combination define an inner peripheral shape;
    providing a stack of metal sheets;
    positioning said stack of metal sheets within said apparatus such that said stack is held by said holding device; then
    linearly displacing said first former segment and said second former segment towards one another and toward said holding device until said first former segment and said second former segment each bears against said stack; then
    rotationally displacing said first former segment and said second former segment around said holding device, thereby bending said stack about said holding device until said stack is shaped into a body having a peripheral outline that generally corresponds in shape to said inner peripheral shape; then
    linearly displacing said third former segment and said fourth former segment towards one another and toward said holding device until said third former segment and said fourth former segment each bears against said body; and
    forcing each of said former segments against said body, thereby providing said body with a final peripheral outline that corresponds in shape to said inner peripheral shape.

2. An apparatus for producing a honeycomb body having a plurality of passages through which a fluid can flow, comprising:
    a first former segment having an inner surface;
    a second former segment having an inner surface;
    a third former segment having an inner surface;
    a fourth former segment having an inner surface; and
    a forked holding device centrally disposed with respect to the former segments, wherein
        (i) the first former segment and the second former segment are each linearly movable towards and away from the forked holding device, and rotationally movable around the forked holding device;
        (ii) the third former segment and the fourth former segment are each only linearly movable towards and away from the forked holding device; and
        (iii) the inner surface of the first former segment faces the inner surface of the second former segment while the inner surface of the third former segment faces the inner surface of the fourth former segment, such that when the former segments are linearly moved towards the forked holding device the inner surfaces combine and form an inner peripheral shape.

3. The apparatus according to claim 2, wherein said first and second former segments are rotationally movable around the forked holding device in the same direction.

4. The apparatus according to claim 2, wherein said first and second former segments are synchronously linearly movable with respect to one another, and said third and fourth former segments are synchronously linearly movable with respect to one another.

* * * * *